United States Patent [19]

Powers

[11] 3,932,371

[45] Jan. 13, 1976

[54] PROCESS FOR PREPARING LOW BULK VISCOSITY POLYMERS

[75] Inventor: Kenneth W. Powers, Berkeley Heights, N.J.

[73] Assignee: Exxon Research and Engineering Company, Linden, N.J.

[22] Filed: Dec. 28, 1973

[21] Appl. No.: 429,129

Related U.S. Application Data

[63] Continuation-in-part of Ser. No. 22,813, March 6, 1970, abandoned, which is a continuation-in-part of Ser. No. 550,649, May 17, 1966, abandoned.

[52] U.S. Cl............................................. 260/85.3 R
[51] Int. Cl.$^2$.... C08F 2/06; C08F 4/14; C08F 4/52; C08F 36/04
[58] Field of Search ............................... 260/85.3 R

[56] References Cited
UNITED STATES PATENTS

| | | | |
|---|---|---|---|
| 3,382,224 | 5/1968 | Wood............................ | 260/85.3 R |
| 3,402,164 | 9/1968 | Miyoshi et al. ................ | 260/85.3 R |
| 3,553,156 | 1/1971 | Anolick et al. ................ | 260/85.3 R |
| 3,562,804 | 2/1971 | Powers.......................... | 260/85.3 R |

FOREIGN PATENTS OR APPLICATIONS

| | | | |
|---|---|---|---|
| 567,414 | 12/1958 | Canada............................ | 260/85.3 |

OTHER PUBLICATIONS

Olah, *Friedel–Crafts and Related Reactions*, Vol. I, Interscience, N.Y., N.Y. (1963), pp. 249–253.

*Primary Examiner*—Alan Holler

[57] ABSTRACT

Polymerization reactions may be carried out in a solvent at a temperature which is above its lower critical solution temperature thereby resulting in a two-phase system comprising a solvent phase containing dissolved therein monomers and low molecular weight fractions of polymer and dispersed fluid phase comprising a solution of solvent in the higher molecular weight fraction of polymer being formed.

This process technique is particularly advantageous in the preparation of low molecular weight isoolefin conjugated diolefin copolymers. In particular, propane has been found to be an ideal solvent for the isoolefin conjugated diolefin polymerization processes.

The use of this type of polymerization process results in a low viscosity system having excellent heat transfer and low fouling characteristics.

9 Claims, 1 Drawing Figure

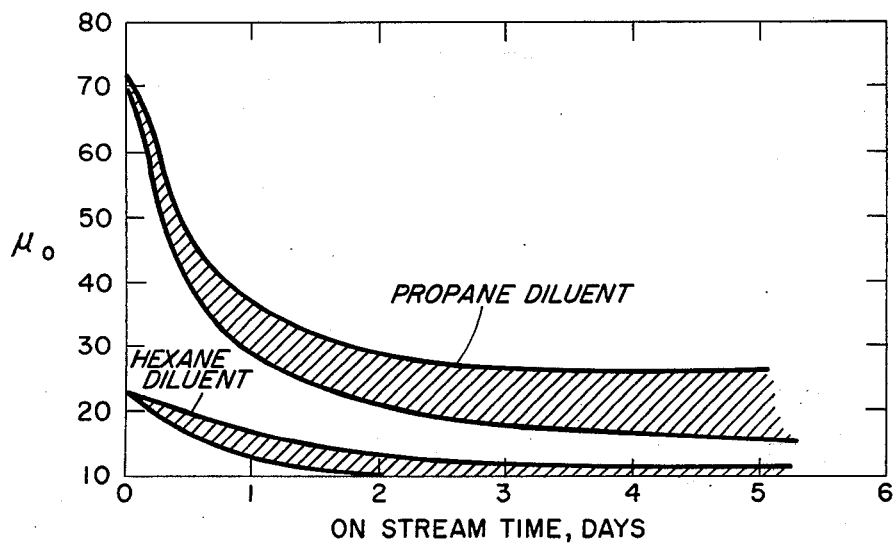

PROCESS FOR PREPARING LOW BULK VISCOSITY POLYMERS

CROSS-REFERENCE TO RELATED APPLICATIONS

This application is a continuation-in-part of Ser. No. 22,813, filed Mar. 26, 1970, and now abandoned, which in turn is a continuation-in-part of Ser. No. 550,649, filed May 17, 1966, and now abandoned.

BACKGROUND OF INVENTION

This invention relates to a method of polymerization particularly in the process of polymerization where the reactions are highly exothermic and the viscosity of the reaction mixture increases greatly at an early stage in the reaction, thus leading to a problem in heat transfer which in turn results in difficulties in control which are manifested by the development of hot spots in the reactor. The ultimate result is gellation of the polymer which in turn causes excessive fouling of the reactor.

Broad disclosures of methods of preparing conventional elastomers, in particular butyl rubbers, may be found in U.S. Pat. No. 2,513,820; 2,529,530; 2,582,411; 2,583,240 and 2,683,138.

Sparks and Garber disclose a polymerization process for the preparation of butyl rubber in their U.S. Pat. No. 2,529,520 which comprises using as the vehicle a mixed solvent phase comprising a blend of a non-solvent and a solvent for the polymer.

Illustrative examples of non-solvents for their process are methyl chloride and ethyl chloride. Illustrative of examples of solvents are butane and pentane. The monomers are completely soluble in the solvent-non-solvent system whereas the polymer is only soluble in the solvent portion of the vehicle.

If a proper adjustment is made with respect to the amount of non-solvent, olefin to be polymerized and the solvent, a solid polymer can be produced which is "solvated" sufficiently to destroy its adhesive power, but is not in solution to such an extent as to raise the viscosity of the system unduly. Accordingly, polymerization may be conducted to any desired extent without yielding a mixture which is too viscous to flow or handle and at the same time the stickiness and adhesiveness of the polymer are so slight that it is readily removed from the reactor walls and stirring equipment merely by the agitation ordinarily produced by the conventional stirrer.

In effect, the polymerization system comprises a bulk non-solvent vehicle having dispersed therein particles of polymer into which solvent has been dissolved such that the solvent-polymer mixture is readily broken up into smaller particles by agitation and are sufficiently solvated so as to avoid agglomeration of the particles.

U.S. application Ser. No. 550,649, incorporated herein by reference discloses certain flowable polymers of this invention prepared in a diluent which includes saturated straight chain, branched chain and cyclic aliphatic hydrocarbons having from 4–8 carbon atoms. Aromatic material such as benzene and toluene are also used. These solvents are solvents for the polymers and the polymerization carried out is characterized as "solution polymerization". Such a solution polymerization has disadvantages resulting from the combination of (1) high viscosity of the solution-polymer system and (2) poor heat transfer characteristics resulting from the high viscosity and from the rapid fouling.

Conventional techniques to produce copolymers of isoolefins and diolefins such as butyl utilize "slurry-polymerization" type of processes in which a non-solvent for the polymer is used as a diluent. However, this type of process has drawbacks when the product to be produced is the low molecular weight flowable viscous polymers of this invention. At the polymerization temperatures, i.e. $-30$ to $-80°C.$, the slurry particles are sticky particles which immediately agglomerate and readily adhere to reactor heat transfer surfaces resulting in complete mass fouling of the reactor.

SUMMARY OF THE INVENTION

It has been found, and forms the substance of this invention, that polymerization processes may be greatly improved by carrying out the polymerization process in a solvent for the polymer at a temperature which is above the lower critical solution temperature of the polymer.

When the reaction is carried out in the aforementioned manner, the polymer as it forms, drops out of solution. However, the solvent is to some extent soluble in the polymer and the polymer-solvent system so formed is sufficiently fluid to be readily broken up into discrete particles by normal agitation in the reactor.

An added feature of this invention is that upon standing, the effluent of this polymerization process will separate into a lighter solvent phase containing the unreacted monomer and the lower molecular weight fraction of polymer and a heavier polymer phase containing higher molecular weight fraction of polymer and solvent. Both phases are fluid and are readily separated by decanting, centrifugation, or other liquid-liquid separation methods.

The lighter phase may be recycled to the reactor without purification and the polymer separated from the lower phase. This phase separation technique results in a reduction in the pounds of solvent which must be processed per pound of polymer produced.

In particular, in the preparation of a flowable isoolefin-conjugated diolefin polymer, propane may be used as the solvent in the manner described above. Good heat transfer properties are obtained, fouling is minimized, and the length of continuous runs is extended to a commercially feasible duration.

In a preferred embodiment for the preparation of LM polymers, the sole vehicle is propane and the catalyst is ethylaluminum dichloride promoted with a halide, the catalyst being dissolved in hexane; the feed stream comprises 40–44% monomers in propane and the reaction is carried out at about $-72°F.$

BRIEF DESCRIPTION OF THE DRAWING

The FIGURE shows a comparison of heat transfer coefficient as a function of onstream time for conventional solution polymerization and the cement-suspension polymerization of this invention.

DETAILED DESCRIPTION

The invention of Ser. No. 550,649 relates to low molecular weight low bulk viscosity flowable halogenated and non-halogenated polymer compositions, cured mastic compositions formed from said polymers and to a process for the formation of the polymers. Though the application is incorporated by reference, selected portions will be reproduced as required for the purpose of clarity of this disclosure.

As used in this specification and claims, the term "LM-polymer" means copolymers of isoolefins and conjugated diolefins. These LM polymers comprise about 85 to 99.5% of a $C_4$–$C_7$ isoolefin such as isobutylene and 15–0.5% of a multiolefin of about 4–14 carbon atoms. The LM polymers generally have a viscosity average molecular weight of about 5000 to about 80,000, more preferably about 10,000 to 60,000, most preferably about 20,000 to 45,000. The term "halogenated LM polymers" as used in the specification and claims refers to the halogenated analogs of the afore-described LM polymers.

The polymers of this invention may be prepared from monomer mixes of the same isoolefin-conjugated diolefin composition as is used in the preparation of butyl rubber.

The LM polymers of this invention may be halogenated in the same manner in which butyl rubber is halogenated. A typical method of halogenating butyl rubber is to form a solution containing about 1 to about 60% by weight of the butyl rubber in an organic solvent such as hexane and thereafter contacting the butyl rubber cement with chlorine gas for a period of 1 second to 1 hour, say 25 minutes whereby chlorinated butyl rubber and hydrogen chloride are formed. The chlorinated copolymers contain about one atom of halogen per double bond in the polymer. The preparation of halogenated butyl rubbers is described in U.S. Pat. No. 3,099,644 which is incorporated herein by reference. This invention is not intended to be limited in any way by the manner in which the LM polymers are halogenated.

The expression "butyl rubber" as employed in the specification and claims is intended to include copolymers made from polymerization reactant mixture having therein about 70 to about 99.5 wt. % of an isoolefin of about 4 to 7 carbon atoms and about 30 to 0.5 wt % of a conjugated multiolefin from about 4 to 14 carbon atoms. The resultant copolymer contains about 85 to about 99.5% of combined isoolefin and about 0.05 to about 15% of combined multiolefin. The term "butyl rubber" is described in an article by R. M. Thomas et al. in *Industrial Engineering and Chemistry*, Volume 32, pp. 1283 et seq., October, 1940.

The term "lower critical solution temperature" as used in the specification and claims means the temperature above which a polymer is no longer soluble in a solvent. The term "upper critical solution temperature" or "theta temperature" as used in the specification and claims is that temperature below which a polymer is no longer soluble in the solvent.

It was discovered and described as the invention of Ser. No. 550,649 that room temperature flowable (low bulk viscosity) low molecular weight halogenated and nonhalogenated polymer compositions that can be readily crosslinked to attractive vulcanizates could be readily formed by the reaction of an isoolefin with a conjugated diolefin and certain diluents with a promoted or unpromoted aluminum compound catalyst system.

The reaction is suitably carried out at reduced polymerization temperatures and moderate polymerization pressures. The products of this invention and that of Ser. No. 550,649 are characterized by a relatively low degree of unsaturation and extremely narrow molecular weight distribution which is believed to account for their flowability at moderate temperatures. The products made by the process of this invention are readily crosslinked using conventional techniques and find utility in the formation of coated and molded articles, mastics, filaments, caulking compounds, etc. These products have somewhat improved physical properties at lower bulk viscosities compared to polymers produced at higher molecular weight such as those produced in solvent polymerizations, i.e. hexane as the vehicle.

Illustrative examples of the conjugated diolefins which may be used to prepare the LM polymers of this invention include isoprene, and 1,3-butadiene, 2,3-dimethyl butadiene, piperylene, cyclopentadiene, etc. The isoolefin component of these LM polymers is preferably an isoolefin of about 4–15 carbon atoms, preferably 4-9 carbon atoms and are typically denominated as Type III olefins having the general formula:

wherein $R_1$ is H or $C_1$–$C_{12}$ alicyclic or acyclic hydrocarbon radical and $R_2$ is a $C_1$–$C_{12}$ alicyclic or acyclic hydrocarbon radical or an aromatic radical, e.g. phenyl; provided however, where $R_2$ is an aromatic radical, $R_1$ may be H and where $R_2$ is not an aromatic radical, $R_1$ may not be H. Preferably, $R_1$ and $R_2$ are $C_1$ to $C_6$ alkyl radicals; more preferably, $R_1$ is methyl and $R_2$ is $C_1$–$C_6$ alkyl radical; most preferably, $R_1$ and $R_2$ are independently selected from methyl and ethyl radicals.

Illustrative examples of these Type III olefins suitable for use in the practice of this invention are isobutylene, 2-methyl-1-butene, alpha-methyl styrene, 2-methyl-1-pentene, 2-methyl-1-octene, 2-cyclohexyl-1-propene, 2-cyclopentyl-1-propene, methylene cyclohexane, methylene cyclopentane, styrene, 2-ethyl-1-butene. In addition, olefins which can yield a tertiary carbonium ion by a hydride ion shift are also suitable. Such olefins include 3-methyl-1-butene, 3-methyl-1-pentene, 4-methyl-1-pentene, etc.

Comonomer compositions useful as feed streams in the preparation of the LM polymers contain about 70 to 99.5 mole % preferably 90–99.5 mole % of the isoolefin, e.g. isobutylene and about 30–0.5 mole %, preferably about 10 to 0.5 mole %, of a conjugated diolefin, e.g. isoprene. These comonomer feed compositions are similar to those used to produce rubbery polymers known in the literature as "butyl rubber". However, the polymers of the instant invention are not rubbers in the usual sense.

Polymers of this invention exhibit iodine numbers of about 20–35, Brookfield viscosities at 200°F. and 0.5 RPM varying from about 10,000 to 600,000 cps., preferably about 10,000 to 200,000 cps. The viscosity average molecular weight as determined in diisobutylene at a concentration of 5 mg/ml. at 20°C. is at least 10,000 and preferably 20,000 to 40,000. These polymers have a narrow molecular weight distribution, that is the ratio of the weight average molecular weight ($\overline{M}_w$) to number average molecular weight ($\overline{M}_n$) as determined by gel permeation chromatography (gpc) is less than 2.5, preferably less than 2.0 and a number average molecular weight as calculated by gpc of at least 10,000.

The polymerization process of this invention is preferably carried out by introducing the polymerization monomers and the diluent in a liquid state into a well-stirred tank type reactor. During the polymerization, sufficient amounts of diluent are maintained in the reaction vessel such that about 0.5 to 20 volumes, preferably 1 to 10 volumes, of diluent are present for every volume of polymer plus unreacted monomer.

The catalyst systems employed in the preparation of the LM polymers of this invention comprise a promoted or unpromoted aluminum compound. High yields are obtained by using aluminum bromide alone or ethyl aluminum dichloride promoted with hydrogen chloride or a $C_3$–$C_7$ organic halide compound.

Illustrative examples of useful organic halides promoters are benzyl chloride, benzyl bromide, allyl chloride, isoprene hydrochloride, methallyl chloride, t-butyl bromide, t-butyl chloride, secondary butyl bromide, secondary butyl chloride, etc. Benzyl chloride is the preferrred promoter.

When the ethyl aluminum dichloride-organic halide catalyst system is used, the catalyst system generally comprises about 96–99.5 wt % of ethyl aluminum dichloride and about 0.5 to 4 wt % of organic halide promoter. However, when hydrogen chloride is used as the promoter, the hydrogen chloride may comprise about 0.1 to about 50 wt % of the total catalyst system, preferably about 1 to about 20 wt %.

The concentration of catalyst present in the reaction zone can vary over a wide range. The amount of catalyst used must be sufficient to covert from 70–99 wt. % of the monomer mixture, preferably 75 to 99 wt %, more preferably at least 85% thereby insuring that polymers having a narrow molecular weight distribution will be produced. Typically, in the case of either aluminum bromide catalyst or the ethyl aluminum dichloride organic halide catalyst system about 0.5 to 1.5 wt. % of catalyst based upon the total monomer is used, preferably, about 0.7 to about 1.0.

In polymerizations wherein the ethyl aluminum dichloride-HC1 catalyst system is employed, smaller amounts of catalyst may be used and catalyst concentrations varying from about 0.1 to about 0.3 wt. % of the monomers is sufficient to secure high yields from the monomer.

The conditions at which the polymerization reaction is carried out can vary over a wide range. Generally, temperatures ranging from about −30 to −80°C. can be used. However, temperatures ranging from about −40 to about −60°C. are preferred. The pressures at which the polymerization is carried out is not critical provided that it is sufficient to maintain the polymerization monomers and solvent in the liquid state. Pressures ranging from 1 to 10 atm. can be used. In most industrial applications, the pressure within the polymerization reaction zone will be the autogeneous pressure exerted by the reactants, e.g. the monomers and/or the solvent.

The reaction time used in the formation of the LM polymers and of this invention is not critical. However, sufficient time should be allowed for the desired monomer conversion, i.e. 70 to 99%, which depends upon temperature, monomer concentration, activity of catalyst, poison levels, etc. In general, high yields of low bulk viscosity copolymer products of this invention are obtained within the temperature and pressure limits set forth above in about 5 minutes to 2 hours.

Tank type reactors provided with high velocity turbines for obtaining good mixing of the reaction monomers and diluents may be employed. The reactor may be constructed of any material that is inert to the reactants used and is capable of withstanding the operating pressures. The reaction vessels made of glass, metal alloys and glass lined metals are satisfactory. Typically, reactors of the type used in the commercial preparation of butyl rubber are adequate.

Although the process of this invention is described in terms of preparation of LM polymer it will be evident to those skilled in the art that the process is applicable in the preparation of any polymer which is conventionally prepared by solution polymerization. In particular, processes for the preparation of hydrocarbon polymers may be carried out by utilizing the concept of selecting a diluent whose lower critical solution temperature for the polymer to be prepared, is below the temperature at which the reaction is to be carried out.

Polymers are soluble in solvents in the range between the upper critical solution temperature and the lower critical solution temperature. Although not all solvent polymer combinations have an upper critical solution temperature, that is the polymer is substantially soluble irrespective of the fact that the temperature of the solvent is depressed, all hydrocarbon solvent-hydrocarbon polymer systems exhibit the lower critical solution temperature phenomena. That is, if the temperature of a solution of polymer and solvent is increased, a temperature is reached, above which the polymer is no longer soluble. Methods of determining lower critical solution temperatures, preparation of phase diagrams for polymers in various solutions and a general discussion of the thermodynamics involved is included in a report entitled "New Aspects of Polymer Solution Thermodynamics" by G. Delmas and D. E. Patterson, published in *The Proceedings of the Paint Research Institute*, number 14, which is incorporated herein by reference.

Briefly, the phase diagrams may be prepared by dissolving a polymer in a given solvent and increasing the temperature until the polymer begins to drop out as exhibited by cloudiness of the solution. The solution is then maintained at that temperature until separation of the two phases occurs. The upper portion is analyzed for percent polymer as is the lower portion. Generally, the lower portion will be a heavier polymer rich phase, the upper portion will be a lighter solventrich phase. A phase diagram may be prepared based on temperature and polymer volume fraction as parameter.

In the selection of a suitable solvent for the practice of this invention it is first necessary to select the desired molecular weight range of the polymer which is to be prepared. The polymer is then dissolved in a solvent at a temperature above its upper critical solution temperature which may be determined in the same manner as the methods described for determining the lower critical solution temperature. The lower critical solution temperature is then determined in the manner indicated by Delmas, supra. It is desirable to determine the viscosity of the polymer rich phase. For proper operation of the process it is preferred that the viscosity of the polymer rich phase be about 1 cps. to about $1 \times 10^6$ cps., more preferably 1 cps. to $1 \times 10^4$ cps., most preferably, less than 1000 cps.; ideally, the viscosity is about 1 to about 500 cps., e.g. 1–250 cps. Although in theory the process may be carried out at any given viscosity of the polymer rich phase, from practical considerations it is desired that the polymer rich phase be fluid, that is pourable at the reaction conditions.

It is obvious that in the selection of the solvent to be used, it is essential that the lower critical solution temperature be below the temperature at which the polymerization is to take place. For example, if a reaction is carried out at about −70 to −30°C., then the polymer must have a lower critical solution temperature in the solvent of below −70° otherwise the desired 2-phase polymerization will not occur.

In the selection of the solvent for the carrying out of the polymerization it may be found that for some solvents the lower critical solution temperature and the upper critical solution temperature ("theta temperature") are not readily distinguished; that is, there is no range in which the polymer is clearly soluble in the solvent. This does not affect the application of this technique to the process. The only requirement is that in such a circumstance the polymer solvent mixture will separate into two phases as described above, i.e. an upper lighter solvent rich fraction and a heavier polymer rich fraction, the polymer rich fraction meeting the necessary viscosity requirements above.

It will be obvious to those skilled in the art that the phase separation phenomenon described above may be used to separate polymers from solution in conventional solution polymerization processes. For example, a solution polymerization may be carried out using a solvent whose lower critical solution temperature is above the temperature at which the polymerization is carried out. The polymer solution may then be warmed to the lower critical solution temperature of the system, thereby causing a two-phase separation into a polymer rich phase and a solvent rich phase. The result is more economical processing of polymer to extract it from the solvent.

It is further obvious that recognizing the advantages of the process of this invention, one need not relate the process to critical solution temperature. For example, the vehicle selected may be (1) a solvent for the monomer, (2) a non-solvent for the polymer to be prepared, i.e. less than 2 wt. % solubility of polymer in vehicle, and (3) sufficiently soluble in the polymer to result in a polymer-solvent-system which is liquid and has a viscosity of about 1 cps. to about $10^6$ cps. more preferably about $10^4$ cps., most preferably less than 1000 cps. The viscosity requirement of the solvent-polymer system is dictated by the fact that normal agitation in the reactor must be sufficient to break down the solvent-polymer system into droplets which are dispersed in the vehicle.

In the preparation of LM polymers it has been found that propane is an ideally suited solvent since the lower critical solution temperature for the propane-LM polymer system is below that of the polymerization temperature, i.e. about −80 to about −30°C. Preferably, the reaction of this invention is carried out in propane at −70 to −40°C.

As pointed out above, on standing the reactant-solvent mixture will separate into two phases, the solvent rich phase and the heavier polymer rich phase. This phenomena is applicable to a more advanced operation of the process. Since the upper solvent rich phase contains monomer and low molecular weight polymer outside the desirable product molecular weight range, it may be recycled to the reactor without any need for purification.

The heavier polymer rich phase is a concentrated solution of polymer. Therefore, less work is required in separating the polymer from the diluent since the amount of diluent associated with the polymer has been minimized. In separating the polymer rich phase it may be desirable to raise the temperature of the solvent polymer mixture to somewhat above the reaction temperature in order to insure a cleaner separation. At this step, however, the temperature should be below the boiling point of the solvent for the pressures used otherwise mixing will occur.

Throughout the specification and claims, the term "cement suspension" shall be taken to mean the mixture of diluent, monomer and polymer at a temperature above the lower critical solution temperature of the diluent-polymer system.

It will be evident from the aforementioned discussion that inherent in this process is a method for stripping lower molecular weight polymer ends from the product polymer, thereby resulting in a more uniform, more desirable product. These lower molecular weight fractions may be recycled to the reactor where they will grow to polymer molecular weights in the desirable range. Not wishing to be bound by the theory, it is postulated that this cement suspension phenomena which occurs above the low critical solution temperature is due to the fact that the free energy of mixing becomes positive at temperatures above the LCST. We know that $\Delta FM = \Delta HM - \Delta SM$ where:

$\Delta FM$ = free energy of mixing
$\Delta HM$ = heat of mixing (enthalpy)
$\Delta SM$ = entropy of mixing
T = temperature at the UCST ($\theta$ temperature) the solubility is increasing with temperature, the heat of solution is positive but is becoming less positive and the entropy of mixing is positive enough to overcome the heat of mixing and make $\Delta FM$ negative. At the LCST, solubility is decreasing with increasing temperature and the heat of solution must now be negative (exothermic). Therefore, for $\Delta FM$ to become positive there must be an unfavorable, as negative, entropy change on mixing. This unusual entropy change on mixing can be explained by postulating that $\Delta SM$ is made up of two components: (1) a geometrical or combinatorial entropy of mixing which is of course always positive and (2) a non-geometrical or non-combinatorial contribution which is negative and overpowers the first. This negative contribution comes about because the coefficient of expansion of the solvent is higher than that of the polymer, especially as the critical temperature of the solvent is approached. Therefore, as the temperature is raised, the solvent molecules tend to get further apart than do the polymer molecules. In order for solvent molecules to stay associated with the polymer molecules, the solvent molecules must assume a more compressed or restricted configuration, or one of lower entropy, than they would in pure solvent. This negative contribution eventually overcomes the geometrical contribution and the overall $\Delta SM$ becomes negative so that the entropy contribution to the free energy of mixing becomes positive. When this positive entropy contribution exceeds the negative heat of mixing, we get a net positive free energy of mixing and phase separation occurs to give the desired "cement-suspension". The higher coefficient of expansion of the solvent compared to the polymer also accounts for the negative heat of mixing because in order for the solvent to become associated with the polymer, it must assume a more compressed or condensed lower energy state and we, in effect, get a "heat of condensation" liberated which contributes to the overall heat of mixing and makes it negative. This same effect is evident in the negative volume effect of mixing which is generally observed.

In the preparation of LM polymers the propane swollen polymer phase is fluid enough that it is easily broken up and dispersed as tiny droplets in the propane. Under the mixing conditions employed during polymerization (ca. 0.1 hp/gal.) the swollen polymer phase is so finely dispersed in the propane diluent that mixture appears to be a slightly cloudy solution.

If one allows this "cement suspension" to stand it will separate into a lower heavy polymer rich phase and a lighter diluent propane rich phase, the lighter phase containing monomers and small amounts of low molecular weight polymer. The resultant cement suspension combines low viscosity with minimum fouling tendencies so that good heat transfer is achieved and attractive reactor run lengths can be achieved before a forced shutdown for cleaning becomes necessary.

The exact composition of the two phases depends on molecular weight and molecular weight distribution of the polymer as well as the composition of the propane phase (i.e. amount of unreacted monomers and other solvents present). However, studies have shown that when a typical low molecular weight flowable LM polymer is dissolved in pure propane at a temperature between −80 and −30°C., a two-phase system results in which the lighter phase contains 3% polymer and 97% propane while the heavy phase contains about 53% polymer and about 47% propane. These values may vary depending on the fraction of polymer which is the low molecular weight range.

The viscosity of the cement suspension produced by this polymerization is difficult to measure but is only a few centipoise at the reaction temperature, i.e. about 1 to about 50 cps., whereas the viscosity of the cement produced during solution polymerization in hexane phase is about 500 cps. In addition to the advantages of reduced viscosity, improved heat transfer and reduced fouling tendency the process of this invention has been found to yield a more desirable product in that the product produced tends to yield higher vulcanizate properties at reduced bulk viscosity. This apparently reflects a somewhat narrower molecular weight distribution in the polymer prepared by the process of this invention. This narrower distribution is in part due to the ability to maintain more homogeneous conditions within the reactor because of the improved heat transfer and reduced viscosity which permits better mixing. The narrowness of the distribution can be improved still further by separating the soluble low ends and recycling them back into the reactor for further growth.

The advantages of the process of this invention may be more readily appreciated by reference to the following examples.

EXAMPLE 1

LM polymer was prepared in solution polymerization using hexane as solvent. Four feed streams were fed continuously into the reactor. The monomer feed stream comprised isobutylene, isoprene and hexane. This solution comprised 83.4 wt. % monomer, 76.8% isobutylene, and 6.6 wt. % isoprene or 8.5 wt. % isoprene or isobutylene, and 16.6% hexane. A 2 wt. % solution of ethyl aluminum dichloride in hexane was prepared as the catalyst and a cocatalyst feed stream containing 0.0507% benzyl chloride in hexane was used as a promoter. Additional diluent was used in carrying out the reaction, this diluent being hexane. The monomer feed stream cocatalyst and catalyst streams and the diluent stream were precooled and fed separately and continuously to a one gallon tank-type reactor wherein polymerization ensued. The reactor was maintained at a constant temperature of about −70°F. by cooling through a jacket around the reactor and through a coil within the reactor. The total heat transfer surfaces so provided was about 3.08 ft.$^2$ per gallon. Agitation was provided by a mixed flow impellor at a power input of about 0.25 horsepower per gallon. Under steady state conditions, the residence time in the reactor was 21 minutes. The concentration of the various reactants in the reactor at steady-state conditions was:

|  | Input g./min. | Converted g./min. | Unreacted g./min. |
|---|---|---|---|
| Isobutylene | 50 | 47.5 | 2.5 |
| Isoprene | 4.25 | 2.55 | 1.70 |
| Hexane | 82.2 | — | — |
| EtAlCl$_2$ | 0.55 | — | — |
| Benzyl chloride | 0.0098 | — | — |

The reaction was carried out at a temperature of about −56°C. and the average residence time in the reactor was about 21 minutes. Overall conversion was 92% with a catalyst efficiency of 91 g. of polymer produced per gram of catalyst.

The effluent from the reactor was a clear, yellow, viscous solution (cement). It was discharged continuously through an overflow line to a chilled product receiver into which alcohol was injected at a rate of twice the stoichiometric catalyst rate to quench the catalyst and yield a clear, colorless, viscous, polymer cement. This was allowed to warm up and was deashed by washing three times with an equal volume of water to remove catalyst residues.

It was then heated and stripped under vacuum to remove unreacted monomers, alcohol, and hexane, and to yield a clear, colorless, viscous, low molecular weight butyl polymer. The resultant polymer had a viscosity average molecular weight of 33,000 and contained about 5.0 wt. % isoprene (~I$_2$ = 27.7).

The viscosity of the cement within the reactor at steady-state conditions was in excess of 500 cps. and the experimental overall heat transfer coefficient was less than 20 BTU/HR., Ft.$^2$, °F. The heat transfer coefficient showed a steady decline as the run progressed and after about 2-½ days on stream, the coefficient had dropped to less than 10. Difficulty was experienced in maintaining a uniform temperature within the reactor and it was necessary to terminate the run. When the reactor was dissembled for cleaning, it was found to be completely coated with insoluble gel. It should be noted that whereas it was possible to polymerize in the small one-gallon reactor, polymerization under similar conditions in a large reactor would have been exceedingly difficult or impossible. The low area to volume ratio of the larger reactor would make it impossible to put enough heat transfer surface into the reactor without creating laminar flow conditions which would considerably broaden the polymer molecular weight distribution by preventing the maintaining of uniform conditions within the reactor. For example, in a 1500 gallon butyl-type reactor, calculations indicate only 1 square foot of heat surface per gallon could be provided. Furthermore, it would be exceedingly difficult to provide the same mixing intensity in the larger reactor - a practical upper limit would seem to be about 0.1 horsepower per gallon. Hence, a coefficient of greater than 30 BTU/Hr. Ft.$^2$, °F. would be required in the large reactor to permit polymerization to be conducted under conditions employed in the one-gallon reactor. Experimental data and heat transfer calculations both show that even the initial coefficient obtained is not high enough and hence, polymerization in a commercial scale reactor is impractical.

In an attempt to carry out an LM polymer solution polymerization, under conditions which could be scaled up to commercial size, an effort was made to reduce the rate of heat evolution or improve the realized coefficient. Modifications attempted to accomplish these objections were increased residence time, reduced conversion and reduced feed monomer concentration. These routes were thoroughly investigated without success. Hence, solution polymerization of LM polymers on a commercial scale in conventional reactors does not appear attractive.

EXAMPLE 2

In an attempt to eliminate the problems inherent in a solution polymerization system, the experiment of Example 1 was carried out using propane as the solvent in a cement suspension polymerization. Three feed streams were fed continuously into the reactor. The monomer feed for this reaction included 99.3% monomers (92.0% isobutylene, 8% isoprene based on isobutylene), 0.257% benzyl chloride based on the isobutylene and 0.67% hexane based on isobutylene, the hexane being introduced with the benzyl chloride. The catalyst stream was a 1.70% ethyl aluminum dichloride in propane. The diluent stream was propane. The three feed streams were metered, precooled and fed separately and continuously into the one-gallon well stirred tank-type reactor of Example 1.

The steady state conditions within the reactor were:

|  | Input, g./min. | Converted g./min. | Unreacted g./min. |
|---|---|---|---|
| Isobutylene | 46.6 | 39.5 | 7.1 |
| Isoprene | 3.72 | 2.31 | 1.41 |
| Hexane | 1.85 | — | — |
| Propane | 68.8 | — | — |
| EtAlCl$_2$ | 0.486 | — | — |
| Benzyl Chloride | 0.0121 | — | — |

The total reactor throughput was 121.5 grams/min. with a product polymer rate of 41.8 grams/min. The reaction temperature was −57.5°C. Overall conversion rate was about 83% and reactor residence time was about 22-½ minutes.

A thin, cloudy, yellow "cement-suspension" was produced in the reactor and allowed to discharge into an overflow line into which alcohol was injected at twice the stoichiometric rate to quench the catalyst and yield a cloudy, colorless cement suspension. This suspension separated slowly into a heavy polymer-rich phase and a light propane phase. The polymer was deashed and stripped as in Example 1 to yield a low molecular weight polymer.

The LM polymer produced had a viscosity average molecular weight ($M_v$) of about 36,000 and a weight percent isoprene content of about 5.5 ($\sim I_2 = 31$).

The viscosity of the cement suspension in the reactor at steady-state was less than 50 cps. and the experimental overall heat transfer coefficient was about 70 BTU/Hr., Ft.$^2$, °F. It declined rapidly at first and as the run progressed it decreased more slowly. After 10 days on stream it dropped to less than 10 and the run was terminated.

The very substantial heat transfer advantages of the propane cement-suspension system as compared to the hexane solution are readily apparent. Even more important, is the fact that the low viscosity of the propane cement suspension makes it possible to put more heat transfer surface into the reactor without encountering laminar flow conditions and destroying mixing efficiency. Thus, a commercial size butyl-type reactor can readily be designed to prepare LM polymers using the propane cement suspension system, whereas a commercial size butyl-type reactor to handle viscous cements when LM polymer is polymerized in hexane solution is impractical or even impossible to design.

EXAMPLE 3

Various experiments were carried out in order to define the heat transfer advantage afforded by the cement suspension polymerization as compared to solution polymerization. A series of solution polymerizations were run under conditions as in Example 1. A second series of cement suspensions were run similar to Example 2. All runs were at polymer concentrations of 33 to 37% in the reactor. The overall heat transfer coefficient as a function of onstream time was calculated for both runs.

Referring now to the FIGURE, the markedly superior heat transfer coefficient realized with the propane cement suspension is obvious. The cross-hatched envelopes show the range of values observed for the cement-suspension runs in propane and for the solution runs in hexane. Although the heat transfer coefficient in the propane cement suspension reaction declined rapidly during the initial portion of the run, the steady state fouling rate in propane is at least as low as hexane as indicated by the slope of the curves after 2 or 3 days onstream and by longer run lengths achievable with propane diluent.

The initial more rapid fall-off of overall heat transfer coefficient is due to the fact that a slight fouling film has a much more noticeable effect on the high coefficient realized in propane than on the much lower coefficient realized in hexane. In other words, the thick viscous cement film which surrounds the heat transfer surface during polymerization in hexane already provides such poor heat transfer that deposition of a thin gel film adds little further resistance. On the other hand, the thin fluid cement suspension film which surrounds the heat transfer surface during polymerization in propane offers so little resistance to heat transfer that a microscopic thin gel film is immediately apparent. Nevertheless, as the FIGURE shows, the overall heat transfer coefficient remains substantially higher in propane than in hexane so that considerably longer length runs are possible in the former. In addition, and of even more importance, the lower viscosity of the propane cement supsension allows for practical design of commercial reactors with sufficient heat transfer surfaces.

EXAMPLE 4

The advantages of carrying out a polymerization at a temperature above the lower critical solution temperature of the polymer-solvent system may be more readily appreciated by the following example.

Three feed streams were prepared:

Feed No. 1 (Feed Blend with Co-Catalyst in Propane) — Isobutylene/isoprene/benzyl chloride in propane. 79.4% monomers, 73.3% isobutylene, 8.44% isoprene on isobutylene, 0.0230% benzyl chloride on isobutylene, 0.615% hexane, 20.0% propane.
Feed No. 2 (Catalyst) — 1.7% ethyl aluminum dichloride in propane
Feed No. 3 (Diluent) — Pure propane The streams were metered, chilled, and fed separately and continuously into a well stirred tank-type reactor as described in Example 2. The feed rates were adjusted and the reactor controlled so that the following steady-state conditions were maintained within the reactor.

TABLE III

| | In. g./min. | Conv. g./min. | Un-reacted |
|---|---|---|---|
| Isobutylene | 49.9 | 37.3 | 12.6 |
| Isoprene | 4.21 | 2.33 | 1.88 |
| Hexane | 1.99 | | |
| Propane | 74.5 | | |
| EtAlCl$_2$ | 0.512 | Prod. Rate — 39.6 g/min. | |
| Benzyl Chloride | 0.0115 | | — 5.24 lb/hr |

The total reactor throughput was 131.1 grams/min. while the product polymer rate was 39.6 grams/min. The reaction temperature was −55.5°C. and the conversion of monomer to polymer was 73%. Average residence time in the reactor was 21 minutes. The product had a Mw of 35,200 and contained 5.88 wt. % isoprene (∼I$_2$ = 33).

The reactor effluent was a thin, cloudy, yellow cement suspension with a non-volatile content of 30.2%. It was collected in a chilled container into which alcohol was injected to quench the reaction and yield a colorless, cloudy, cementsuspension. A portion of the effluent was deashed and recovered by flashing off all the propane and non-volatiles so that the total polymer was recovered (designated Sample A). A second portion of the effluent was allowed to settle into a polymer rich heavy phase and a light phase containing most of the volatiles and some very low molecular weight polymer. The light phase was decanted off and the heavy phase was deashed and recovered separately (designated Sample B). Properties of the total polymer and separated heavy phase are compared below:

TABLE IV

| Sample | GPC $M_w$ | $M_n$ | $M_w/M_n$ | INOPO* |
|---|---|---|---|---|
| Sample A (Total Polymer) | 35,200 | 15,000 | 2.35 | 33 |
| Sample B (Heavy-Phase Only) | 39,100 | 18,200 | 2.15 | 29 |

*INOPO = Iodine Number of the Polymer — grams of I$_2$ which react with 100 grams of polymer using the drastic I$_2$-mercuric acetate method as described by Gallo, Wiese & Nelson in I. & EC. 40, 1277 (1948).

As indicated by the data, the rejection of the low ends which were dissolved in the lighter phase results in a more desirable polymer with narrower molecular weight distribution.

In the recovery of the total polymer, 2.31 lbs. of volatiles had to be vaporized from the cement suspension per pound of polymer recovered. All of this material would have to be recovered, purified and recycled in a commercial plant. In the recovery of the heavy phase only polymer, only 1.82 lbs. of heavy phase had to be processed per pound of polymer recovered and 1.68 lbs. of light phase which was separated could be recycled directly back into the reactor along with fresh monomers and catalyst. This light phase consisted of 1.63 lbs. of volatiles and 0.05 lbs. of low molecular weight polymer.

Thus, by utilizing light phase separation and recycle, only 0.82 lbs. of volatiles must be vaporized from the heavy phase and repurified for recycle per pound of polymer produced compared to 2.31 pounds of volatiles for a conventional (i.e., solution) polymerization in which all volatiles must be vaporized and recycled.

By utilizing light phase separation and recycle (which cement supsension polymerization makes possible) 1.68 pounds of recycle can be handled directly at minimal cost. Hence, the recovery and recycle portions of a commercial plant would only have to be about 35% as large for the cement suspension process as for a conventional process which did not utilize light phase recycle.

The following examples show the criticality of parameters in order to achieve a useful 2-phase "cement-suspension" system in the reactor during the polymerization of LM polymers.

EXAMPLE 5

In Example 2, a useful 2-phase system was achieved under the following conditions:

% monomers in total reactor feed were 50.32/121.5 = 41.4%
Reaction temperature was −57.5°C
Conversion was 83%
Polymer concentration at steady-state was 34.4%
Residual monomer concentration at steady-state was 7.0%
Hexane concentration = 1.53%
Polymer $\overline{M}v$ = 36,000

At steady-state in the reactor 41.8 g/mm. of polymer were being produced in a mixture of hydrocarbon liquids consisting of 68.8 g. of propane, 1.85 g. of hexane, and 8.5 g. of unreacted monomers. The hexane and unreacted monomers are much better solvents for the polymer than the propane so the ratio of good solvent to total solvent in this hydrocarbon mixture was 10.36/79.16 = 13.1%. At −57.5°C. the system was above the LCST of the polymer in this solvent blend and so it formed two phases as it was produced in the reactor. It formed about 81 parts by weight of heavy phase and 40 parts by weight of light phase with the components partitioning between the phases about as follows:

Heavy phase composition: 40.3 Polymer/8.5 monomers + hexane/32.3 propane or about 50% polymer/50% solvents Light phase composition: 36.5 propane/1.5 polymer/2.0 monomers + hexane or about 3.7% polymer/96.3% solvents The light phase was a very thin liquid with a viscosity of under 1 cps. The heavy phase was also a liquid phase because of the high amounts of solvents associated with the polymer and its viscosity was about 2200 cps. This heavy liquid phase was thin enough to be easily broken up and dispersed in the light phase to give a liquid/liquid dispersion in the reactor with an overall viscosity close to that of the light phase or less than 50 cps. to result in good heat transfer and low fouling.

In another similar run, similar feed streams were fed into the reactor, but the catalyst rate was reduced to achieve lower conversion and set up the following steady-state within the reactor:

STEADY-STATE CONDITIONS WITHIN REACTOR

| | Input g/min. | Converted g/min. | Unreacted g/min. |
|---|---|---|---|
| Isobutylene | 44.6 | 26.2 | 18.4 |
| Isoprene | 3.79 | 1.75 | 2.04 |
| Hexane | 2.07 | | |
| Propane | 66.7 | | |
| EtAlCl$_2$ | 0.281 | | |
| Benzyl Chloride | 0.0070 | | |

The total reactor throughout was 117.4 g./min. with a product polymer weight of 28.0 g/min. The reaction temperature was −55°C. Overall conversion was about 58% and reactor residence time was about 23-1/2 min. In this case the reactor effluent was clear yellow viscous solution (cement) as in example 1 with the poor heat transfer and other problems of that example. The polymer being produced had an Mv of 32,500 and contained 6.3 wt. % isoprene ($\sim$I$_2$ = 35.9).

In this example, even though we used propane diluent we did not achieve a 2-phase system but a solution instead because there was too much unreacted monomer in the reactor of steady-state. The conditions in this example were:

% Monomers in total reactor feed were 48.39/117.4 = 41.2%

Reaction temperature was −55°C.

Conversion was 58%

Polymer concentration at steady-state was 23.8%

Residual monomer concentration at steady-state was 17.4%

Hexane concentration was 1.77%

Polymer $\overline{M}v$ = 32,500

At steady-state in the reactor 28.0 g./min. of polymer were being produced in a mixture of hydrocarbon liquids consisting of 66.7 g. of propane, 2.07 g. of hexane, and 20.44 g. of unreacted monomers. In this case the ratio of good solvents to total solvent in the hydrocarbon mixture was 22.51/89.2 = 25.2%. At −55°C. the system was below the LCST of the polymer in this solvent blend and so it formed a viscous solution rather than the desirable 2-phase system.

EXAMPLE 6

In a run similar to that of Example 5, similar feed streams were fed into the reactor but instead of merely introducing minor amounts of hexane with the benzyl chloride, the amount of hexane fed was increased and set up the following steady-state within the reactor:

STEADY-STATE CONDITIONS WITHIN REACTOR

| | Input g/min. | Converted g/min. | Unreacted g/min. |
|---|---|---|---|
| Isobutylene | 49.4 | 38.5 | 10.9 |
| Isoprene | 4.21 | 2.16 | 2.05 |
| Hexane | 29.7 | | |
| Propane | 47.4 | | |
| EtAlCl$_2$ | 0.60 | | |
| Benzyl Chloride | 0.0122 | | |

The total reactor throughput was 131.3 g/min. with a product polymer weight of 40.6 g./min. The reactor temperature was −57.5°C. Overall conversion was about 75.5% and reactor residence time was about 21 minutes. In this case, the reactor effluent was again a clear yellow viscous solution (cement) as in Example 1 with the poor heat transfer and other problems of that example. The polymer being produced had an $\overline{M}v$ of 34,800 and contained 5.3 wt. % isoprene ($\sim$I$_2$ = 29.9).

In this example, we again failed to achieve a desirable 2-phase system in the reactor but a solution instead because there was too much of the good solvent, e.g., C$_5$-C$_9$ hydrocarbon (hexane here), in the reactor at steady-state. The conditions in this example were:

% Monomers in total reactor feed were 53.61/131.3 = 40.9%

Reaction temperature was −57.5°C.

Conversion was 75.5%

Polymer concentration at steady-state was 30.9%

Residual monomer concentration at steady-state was 9.85%

Hexane concentration was 22.6%

Polymer $\overline{M}v$ = 34,800

At steady-state in the reactor 40.6 g./min. of polymer were being produced in a mixture of hydrocarbon liquids consisting of 47.4 g. propane, 29.7 g. hexane, and 12.95 g. unreacted monomers. In this case the ratio of good solvents to total solvent in the hydrocarbon mixture was 42.65/90.05 = 47.5%. At −57.5°C. the system was below the LCST of the polymer in this solvent blend and so it formed a viscous solution rather than the desirable 2-phase system.

EXAMPLE 7

In a run similar to that of Example 5, similar feed streams were fed into the reactor but the monomer feed concentration was increased in the reactor to set up the following steady-state within the reactor:

STEADY-STATE CONDITIONS WITHIN REACTOR

| | Input g./min. | Converted g./min. | Unreacted g./min. |
|---|---|---|---|
| Isobutylene | 50.4 | 43.3 | 7.1 |
| Isoprene | 4.17 | 2.70 | 1.47 |
| Hexane | 2.10 | | |
| Propane | 51.8 | | |
| EtAlCl$_2$ | 0.573 | | |
| Benzyl Chloride | 0.0116 | | |

The total reactor throughput was 109.1 g/min. with a product polymer weight of 46.0 g/min. The reactor temperature was −55°C. Overall conversion was about 84.5% and reactor residence time was about 23 minutes. In this case a 2-phase liquid/liquid system was produced but the light phase was dispersed in the heavy phase so that viscosity was very high and heat transfer very poor. The polymer being produced had an $\overline{M}v$ of 33,900 and contained 5.9 wt. % isoprene (I$_2$ = 33).

In this example, we failed to achieve a desirable 2-phase system because there was too much of the heavy phase relative to the amount of light phase so that the heavy phase became the continuous phase and very high viscosity resulted. The conditions in this example were:

% Monomers in total reactor feed were 54.57/109.1 = 50.0%

Reaction temperature was −55°C.

Conversion was 84.5%

Polymer concentration at steady-state was 42.1%.

Residual monomer concentration at steady-state was 7.7%

Hexane concentration = 1.92%

Polymer $\overline{M}v$ = 33,900

At steady-state in the reactor, 46.0 g/min. of polymer were being produced in a mixture of hydrocarbon liquids consisting of 51.8 g. propane, 2.10 g. hexane, and 8.57 g. unreacted monomers. The ratio of good solvents to total solvent in this hydrocarbon mixture was 10.67/62.47 = 17.0%. At −55°C. the system was above the LCST of the polymer in this solvent blend and so it formed two phases as it was produced in the reactor. It formed about 91 parts by weight of heavy phase and 18 parts by weight of light phase with the components partitioning between the phases about as follows:

Heavy phase composition: 45.5 polymer/9.6 monomers + hexane/35.3 propane or about 50% polymer/50% solvents Light phase composition: 16.5 propane/0.5 polymer/1.1 monomer + hexane or about 2.8% polymer/97.2% solvents The light phase was a very thin liquid with a viscosity under 1 cps. The heavy phase was also a liquid phase because of the large amounts of solvents associated with the polymer and its viscosity was about 2000 cps. The heavy phase was thus thin enough to be broken up and dispersed as in the Example 2 of the case, but there was so little of the light phase that in this case the light phase dispersed in the heavy phase instead of vice/-versa as in Example 2 and the reactor viscosity was thus very high. In order to keep the light phase continuous and be able to disperse the heavy phase in it, the light phase should comprise at least 20% by volume of the total reactor volume.

At the high feed monomer concentration used in this example, there is no way of achieving an operable 2-phase system. At high conversion there is too much heavy phase and a viscous heavy phase continuous 2-phase system results. At low conversion there is too much unreacted monomer and a viscous solution results. The desirable 2-phase system can thus be produced only over a restricted feed monomer concentration range.

EXAMPLE 8

The following example illustrates the inoperability of a conventional slurry polymerization for producing an LM polymer. In this example we attempted to duplicate the conditions of Example 2 but instead of using propanae as the diluent we used methylene chloride as the non-solvent. Feed streams were similar to Example 2 (of case) except that propane was everywhere replaced with methylene chloride. Steady-state flows into the reactor were:

ATTEMPTED STEADY-STATE WITH MeCl₂ DILUENT

| | Input g./min. |
|---|---|
| Isobutylene | 47.0 |
| Isoprene | 3.75 |
| Hexane | 1.75 |
| Methylene Chloride | 68.9 |
| EtAlCl₂ | 0.485 |
| Benzyl Chloride | 0.0120 |

Total reactor throughput was 121.9 g./min. and reactor temperature at the start was −57.5°C. and an effort was made to maintain temperature at −57.5°C. In this example, it was not possible to establish a steady-state within the reactor because within less than one half hour of initiating polymerization the reactor had already fouled out and become inoperable. Although a lot of polymer was being produced in the reactor, the effluent from the reactor persisted as methylene chloride with unreacted monomers and essentially no polymer throughout the run. Almost all of the polymer produced stayed right in the reactor to fill it up and jam the stirrer and plug all feed inlets. A 2-phase system was being produced in the reactor, but the polymer was separating as a sticky solid phase instead of as a second liquid phase. The sticky polymer particles produced agglomerated with each other and stuck to the stirrer and walls of the reactor. Mixing and heat transfer very quickly became impossible and within less than one half hour the stirrer jammed and the feed inlets plugged so the run was aborted. The reactor was warmed and disassembled and found to be nearly filled with a sticky mass of LM butyl.

Clearly, the 2-phase system produced in this example was highly undesirable and caused immediate and massive fouling of the reactor. In this example, the polymer is essentially insoluble in the methylene chloride and so separates from it as produced to form a second phase in the reactor. However, the methylene chloride is also essentially insoluble in the polymer so instead of the polymer separating as a solvent swollen liquid phase (as with propane as the diluent under the right conditions) it separates as a sticky monomer swollen solid phase which agglomerates and sticks to everything to rapidly foul out the reactor. It is thus clear that it is only under very special conditions that a desirable 2-phase system is produced which is why Wood and others have taught to avoid this 2-phase region.

If the polymer separates as a relatively non-sticky glassy polymer as in normal slurry polymerization of high molecular weight butyl at low temperatures, the 2-phase system is operable. If it separates as a sticky solid as in polymerization of Butyl LM or other elastomers at temperatures well above the glass temperature, then the 2-phase system is undesirable as it produces immediate mass fouling of the reactor.

EXAMPLE 9

In another example which shows the criticality of conditions, required for producing a desirable 2-phase system in the reactor, the conditions of Example 2 were duplicated except that the polymer to be prepared was polyisobutylene. Feed streams were similar to Example 2, but the isoprene was replaced by additional isobutylene to establish the following steady-state flows into the reactor:

ATTEMPTED STEADY-STATE WITHOUT ISOPRENE

| | Input g./min. |
|---|---|
| Isobutylene | 50.5 |
| Isoprene | — |
| Hexane | 1.80 |
| Propane | 68.9 |
| EtAlCl₂ | 0.475 |
| Benzyl Chloride | 0.0115 |

Total reactor throughput was 121.7 g./min. and an effort was made to retain reactor temperature at −57.5°C.

As in Example 8, it was not possible to establish a steady-state within the reactor because the reactor rapidly fouled out and became inoperable. A very high conversion was achieved and a great deal of polymer was produced in the reactor, but the effluent from the reactor persisted as essentially pure propane throughout the run. Nearly all of the polymer produced stayed in the reactor to foul it out and cause termination of the run. Again a 2-phase system was being produced in the reactor but the polymer was separating as a sticky semisolid which was too viscous and too sticky to disperse in the light phase. The polymer formed a viscous sticky mass within the reactor which made mixing and heat transfer impossible. The reactor warmed rapidly until the propane started boiling and spurting from the reactor and the reaction had to be quenched and the run aborted. Polymer recovered from the reactor when it was warmed and disassembled for cleaning was a reasonably high molecular polyisobutylene ($\overline{M}v >$ 100,000).

Clearly the 2-phase system produced in this example was also highly undesirable and caused rapid massive fouling of the reactor. In this example, the VISTANEX being produced was of reasonably high molecular weight and all the monomer was essentially being consumed so no unreacted monomers were present in the reactor to act as a cosolvent for the polymer. The polymer being produced was essentially insoluble in the propane and so separated from it as produced to form a second phase in the reactor. However, the propane was not soluble enough in the polymer to reduce its viscosity enough for it to behave as a second liquid phase and be dispersed in the propane. Instead the polymer phase separated as a very viscous and sticky semisolid phase which filled the reactor to prevent heat transfer and mixing and necessitated termination of the run.

This example again shows that the desirable liquid/liquid "cement suspension" 2-phase system of this invention can only be achieved under very carefully selected and controlled conditions.

EXAMPLE 10

In this example, the conditions of Example 9 were repeated to produce a lower molecular weight polyisobutylene but still failed to produce a desirable 2-phase "cement-suspension" system. Feed monomer concentration was reduced, polymerization temperature was warmed, and HCl was added as a transfer agent to reduce molecular weight. The following steady-state was set up within the reactor.

| STEADY-STATE CONDITIONS WITHIN REACTOR | | | |
|---|---|---|---|
| | Input g./min. | Converted g/min. | Unreacted g./min. |
| Isobutylene | 34.2 | 33.2 | 1.0 |
| Hexane | 0.2 | | |
| Propane | 79.8 | | |
| EtAlCl$_2$ | 0.059 | | |
| HCl | 0.073 | | |

Total reactor throughout was 114.3 g./min. with a polymer production of 33.2 g/min. The reactor temperature was maintained at −40°C. Conversion was about 97% and reactor residence time about 24 minutes. The polymer being produced had an $\overline{M}v$ of ~ 47,000 but we were never able to achieve a steady-state because the reactor fouled out.

In this example, even though propane was used as the diluent, and the product produced was a low molecular weight polyisobutylene, we still failed to achieve an operable 2-phase "cement-suspension" because the polymer was too soluble in the diluent and the diluent was not soluble enough in the polymer. Reactor fouling forced termination of the run before a good steady-state was reached so we can only approximately describe phase compositions and behavior. Reactor effluent soon after polymerization initiated was a fairly fluid and nearly colorless solution. Viscosity of this solution increased gradually and solids rose to 10–15% but it soon became evident that much polymer was remaining in the reactor. This was evidenced by worsening heat transfer and laboring of the stirrer. After about an hour some very viscous heavy phase started coming out along with the solution phase but the heavy phase was not dispersed and was so viscous that it was more or less extruding out as a separate phase. The high viscosity in the reactor was nearly stopping the stirrer and heat transfer was becoming impossible. Shortly thereafter, the propane began to boil and spurt globs of viscous polymer out of the reactor so the run had to be terminated. The reactor had nearly filled with the heavy phase polymer.

In this case, the diluent was almost pure propane since nearly all of the isobutylene was being polymerized, but the polar HCl was present in high enough concentration to make the polymer more soluble in the propane than normally, so that the light phase became a moderately viscous polymer solution. (The diluent was actually an HCl/propane mixture which had a higher solubility parameter than pure propane so the polymer was more soluble in it). Some of the polymer produced (the low molecular weight tail of the distribution being produced) was thus retained in solution and raised the viscosity of the light phase coming out of the reactor. The balance of the polymer separated as a heavy phase in the reactor, but the propane was not soluble enough in the polymer to convert it to a dispersible liquid so it was settling and being retained in the reactor. The heavy phase was too viscous to be dispersed as a stable dispersion in the light phase so it formed a viscous mass which remained in the reactor and fouled it out.

This 2-phase system was again highly undesirable and produced rapid fouling of the reactor. It was undesirable from two aspects:

1. The light phase had too much polymer dissolved in it and so was already fairly viscous. Therefore, even if the heavy phase had been dispersible in it, a fairly high reactor viscosity would have resulted. For the 2-phase dispersion, viscosity is given approximately by the Einstein relationship:

$$N = N_0 (1 + 2.5 \phi)$$

where:
$N =$ Viscosity of suspension
$N_0 =$ Viscosity of external (light) phase
$\phi =$ Volume fraction of dispersed (heavy) phase Thus, for a desirable 2-phase system, it is necessary that the light phase have a very low viscosity or in other words that it contain very little dissolved polymer.

The heavy phase in this example was too viscous to be dispersed in the light phase because the solvent phase was not soluble enough in the polymer. Under the mixing intensity available the heavy phase settled in the reactor and fouled it out.

In order to achieve the desirable 2-phase "cement-suspension" of this invention, then, it is clear that two very specific criteria must be met. The light phase must be a very poor solvent for the polymer so that its viscosity remains low, whereas the polymer rich heavy phase must separate out, containing enough solvents that it behaves as a liquid and can be dispersed in the light phase. The upper viscosity limitation of the heavy phase at which dispersion can be achieved is dependent upon conditions and especially upon the type and intensity of mixing provided but is certainly less than $10^6$ cps. In most cases, the upper viscosity limitation will be about $10^4$ cps. with a viscosity of several thousand cps. or less being preferred. The light phase should have as low a viscosity as possible, most preferably less than 1 cps. but less than 20 cps. as a maximum upper limit. The "cement suspension" will have a viscosity as given by Einstein's relationship and governed by light phase viscosity and volume fraction of the heavy phase. Its viscosity should be less than 100 cps. and most preferably less than 50 cps.

The desired "cement-suspension" is produced by careful selection and control of parameters. As pointed out in the case, the most general way of producing a phase separation is to operate above the LCST of the particular polymer/solvent system but all the parameters must be adjusted so that a desirable "cement suspension" is produced under polymerization conditions.

Polymerization temperature and catalyst system are chosen to produce the desired molecular weight and then the solvent system is chosen to yield the desired separation.

In general, as the temperature is raised further and further above the LCST of the system, the polymer phase separates with less and less solvent associated with it so that there is only a limited temperature range above the LCST in which it will separate as a liquid phase. At higher temperatures it will separate as a sticky solid phase which will foul out the reactor. The amount of solvent required in the polymer phase to reduce its viscosity to the point at which it can be dispersed as a second liquid phase is, of course, dependent upon molecular weight of the polymer and so the operable range for high molecular weight polymers is narrower than for low molecular weight polymers.

As pointed out in the examples, it is often desirable to use a solvent blend one component of which has a solubility parameter close to that of the polymer so that it will be preferentially imbibed by the polymer above the LCST of the system and so reduce viscosity of the heavy phase. Unreacted monomers can often serve as this component of the solvent blend. Of course, the LCST is a function of the entire system and the presence of the good solvent will raise the LCST. Thus, too much of the good solvent will raise the LCST of the system above the polymerization temperature and produce solution as shown in our examples. The solvent system must be carefully chosen so that a desirable 2-phase system results at the required polymerization temperature. Cosolvents can also affect the solubility of the polymer in the light phase and must be chosen so that the polymer is always very sparingly soluble in the light phase. It is generally undesirable for the solvent blend to consist of one component with a solubility parameter much lower than the polymer and the other with a solubility parameter much higher (as in our example with HCl and propane in Example 6) because this is more likely to result in increasing polymer solubility in the light phase and so in increasing viscosity of the system.

The relative volumes of the heavy and light phases produced must also be properly controlled so that the light phase becomes the continuous phase with the heavy phase dispersed in it. As soon as the heavy phase becomes continuous a high viscosity results. Generally at least 20 volume % of light phase (monomer/solvent rich phase) is required to achieve a useful "cement-suspension". Viscosity is of course lower the less the amount of heavy phase that is present, but as long as the light phase remains continuous and is itself of low viscosity, then reasonable "cement suspension" viscosity results. The highest practical volume of heavy phase (polymer rich phase) is desirable from a production rate viewpoint.

The relative volume of heavy phase is of course dependent upon feed monomer concentration and conversion; but steady-state unreacted monomer concentration is also dependent upon these variables. At high monomer concentration and high conversion, heavy phase volume ratio gets too high as in Example 7 and the heavy phase becomes continuous to give a non-useful viscous 2-phase system. At high monomer concentration and low conversion there are too much unreacted monomers present at steady-state and LCST is raised above polymerization temperature to give a solution as in Example 5. Low feed monomer concentrations are undesirable from a production rate viewpoint. There is thus a limited feed monomer concentration range over which useful "cement suspensions" can be produced. For LM polymers in propane, the preferred feed monomer concentration range is 40–44%. Steady-state unreacted monomer concentration must be kept below 25% on total solvent at steady-state. Steady-state monomer concentration must also not be allowed to fall too low or the heavy polymer-rich phase becomes too viscous for proper dispersion and also a diffusion controlled polymerization results. For Butyl LM polymers in propane, conversion must be controlled between about 60 and 90% to achieve useful "cement-suspensions".

In carrying out the polymerization of LM polymers in propane, the monomers must be present under steady conditions in the reactor to solvate the polymer-rich phase since the propane itself is not sufficiently soluble in the polymer. The steady-state monomer concentration in the reactor must be about 4 to about 23 weight percent based on monomer plus propane. A portion of the monomer may be replaced by a $C_5$ to $C_9$ alkane. Hence, the critical limitation at steady-state is about 4 to about 25 volume percent monomers plus $C_5$ to $C_9$ alkane based on total monomers plus propane plus $C_5$–$C_9$ alkane.

Where the only non-reactive diluent is propane, the critical monomer concentration is achieved by maintaining the monomers concentration in the feed at about 40–44 volume percent based on monomers plus propane and carrying out the reaction at about 60 to about 90% conversion, preferably about 70 to 85% conversion. Under these conditions, the preferred polymerization temperature is about −65°F. to about −75°F., e.g.−72°F.

In carrying out the polymerization of this invention, the preferred catalyst/solvent is a $C_5$–$C_9$ alkane, preferably a $C_6$–$C_8$ alkane, e.g., hexane. The catalyst solvent must be taken into account when making the volume concentration calculations described above.

What is claimed is:

1. A two phase polymerization process for preparing an LM polymer which comprises reacting at polymerization conditions a $C_4$–$C_6$ conjugated diolefin with an isoolefin having the general formula:

wherein $R_1$ is H, a $C_1$–$C_{12}$ acyclic hydrocarbyl radical or a $C_1$–$C_{12}$ alicyclic hydrocarbyl radical and $R_2$ is a hydrocarbyl radical selected from the group consisting of phenyl, $C_1$–$C_{12}$ acyclic radicals, $C_1$–$C_{12}$ alicyclic radicals and mixtures thereof, in the presence of a catalyst selected from the group consisting of (1) aluminum bromide and (2) ethyl aluminum dichloride promoted with a compound selected from the group consisting of hydrogen chloride, $C_3$–$C_7$ organic halides, and mixtures thereof, said catalyst being dissolved in a $C_5$–$C_9$ alkane; said polymerization being carried out in a vehicle wherein said vehicle is (1) propane or (2) propane plus a $C_5$–$C_9$ alkane, the reaction being carried out continuously with the steady-state concentration of monomers to be polymerized plus $C_5$–$C_9$ alkane is about 4 to about 23 weight percent based on monomers plus propane, plus $C_5$–$C_9$ alkane, the polymerization being carried out at a temperature of about $-30$ to about $-80°C$. and the polymerization being carried out at a conversion rate of about 60 to about 90%.

2. The process of claim 1 wherein the propane is the sole vehicle, the concentration of monomers in the feed stream to the reactor is about 40–44 volume % based on monomers plus propane, and the catalyst solvent is hexane.

3. The process of claim 1 wherein the vehicle is propane plus a $C_5$–$C_9$ alkane.

4. The process of claim 3 wherein the alkane is a $C_6$–$C_8$ alkane.

5. The process of claim 4 wherein the alkane is hexane.

6. The process of claim 1 wherein $R_1$ is methyl and $R_2$ is an alkyl radical of about 1 to about 6 carbon atoms.

7. The process of claim 1 wherein:
 1. the vehicle containing polymer product is allowed to stand at a temperature above the lower critical solution temperature of the solvent-polymer system for a time sufficient to cause separation into a lighter solvent rich phase and a heavier polymer rich phase;
 2. the lighter solvent rich phase is recycled to the reactor; and
 3. the polymer is separated from the heavier polymer rich phase.

8. The process of claim 7 wherein $R_1$ is methyl and $R_2$ is an alkyl radical having about 1 to about 6 carbon atoms.

9. The process of claim 7 wherein the isoolefin is isobutylene, the diolefin is isoprene and the catalyst is ethyl aluminum dichloride promoted with a minor amount of benzyl chloride.

* * * * *